(12) United States Patent
Auyeung

(10) Patent No.: US 9,843,812 B2
(45) Date of Patent: Dec. 12, 2017

(54) VIDEO TRANSMISSION SYSTEM WITH COLOR GAMUT PARTITIONING AND METHOD OF OPERATION THEREOF

(71) Applicant: Sony Corporation, Tokyo (JP)

(72) Inventor: Cheung Auyeung, Sunnyvale, CA (US)

(73) Assignee: SONY CORPORATION, Tokyo (JP)

( * ) Notice: Subject to any disclaimer, the term of this patent is extended or adjusted under 35 U.S.C. 154(b) by 321 days.

(21) Appl. No.: 14/718,808

(22) Filed: May 21, 2015

(65) Prior Publication Data

US 2015/0341648 A1 Nov. 26, 2015

Related U.S. Application Data

(60) Provisional application No. 62/002,400, filed on May 23, 2014.

(51) Int. Cl.
| | |
|---|---|
| *H04B 1/66* | (2006.01) |
| *H04N 19/186* | (2014.01) |
| *H04N 19/124* | (2014.01) |
| *H04N 19/50* | (2014.01) |
| *H04N 19/187* | (2014.01) |

(52) U.S. Cl.
CPC ......... *H04N 19/186* (2014.11); *H04N 19/124* (2014.11); *H04N 19/187* (2014.11); *H04N 19/50* (2014.11)

(58) Field of Classification Search
CPC .......................... H04N 19/186; H04N 19/187
USPC ............................... 375/240.26; 382/162.167
See application file for complete search history.

(56) References Cited

U.S. PATENT DOCUMENTS

| | | | |
|---|---|---|---|
| 2011/0211122 A1* | 9/2011 | Sullivan | ................ G06T 3/4007 348/581 |
| 2014/0133749 A1* | 5/2014 | Kuo | ........................ G06T 7/408 382/167 |

* cited by examiner

*Primary Examiner* — Sath V Perungavoor
*Assistant Examiner* — Peet Dhillon
(74) *Attorney, Agent, or Firm* — Haverstock & Owens LLP

(57) ABSTRACT

A video transmission system and the method of operation thereof includes: a video transmission unit for receiving a first video frame from an input device, the first video frame having base frame parameters; dividing a color gamut into uniform regions for collecting color data from pixels of the base frame parameters; collecting pixel statistics from each of the uniform regions from the base frame parameters; determining chroma partition coordinates from the pixel statistics; deriving a search pattern of search points based on the chroma partition coordinates; and selecting the search point from the search pattern for color mapping of the first video frame.

20 Claims, 6 Drawing Sheets

VIDEO TRANSMISSION SYSTEM WITH COLOR GAMUT PARTITIONING AND METHOD OF OPERATION THEREOF

CROSS-REFERENCE TO RELATED APPLICATION(S)

The present application contains subject matter related to co-pending U.S. patent application Ser. No. 14/541,741 filed Nov. 14, 2014. The related application is assigned to Sony Corporation and the subject matter thereof is incorporated herein by reference thereto.

This application claims the benefit of U.S. Provisional Patent Application Ser. No. 62/002,400 filed May 23, 2014, and the subject matter thereof is incorporated herein by reference in its entirety.

TECHNICAL FIELD

The present invention relates generally to a video transmission system, and more particularly to a system for encoding video transmissions with color gamut partitioning for data compression.

BACKGROUND ART

With the advanced development of camera technology, the amount of data associated with a single frame has grown dramatically. A few years ago camera technology was limited to a few thousand pixels per frame. That number has shot past 10 million pixels per frame on a relatively inexpensive camera and professional still and movie cameras are well beyond 20 million pixels per frame.

This increase in the number of pixels has brought with it breath-taking detail and clarity of both shapes and colors. As the amount of data needed to display a high definition frame has continued to grow, the timing required to display the data on a high definition television has dropped from 10's of milliseconds to less than two milliseconds. The unprecedented clarity and color rendition has driven the increase in the number of pixels that we desire to view.

In order to transfer the now massive amount of data required to identify the Luma (Y), the Chroma blue (Cb), and the Chroma red (Cr) for every pixel in the frame, some reduction in the data must take place. Luma is associated with the brightness value and both Chroma blue (Cb), and the Chroma red (Cr) are associated with the color value. Several techniques have been proposed, which trade a reduction in detail for full color, a reduction in color for more detail, or a reduction in both detail and color. There is yet to be found a balanced approach that can maintain the detail and represent the full color possibilities of each frame.

Thus, a need still remains for video transmission system with color prediction that can minimize the transfer burden while maintaining the full detail and color content of each frame of a video stream. In view of the ever increasing demand for high definition movies, photos, and video clips, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

DISCLOSURE OF THE INVENTION

The embodiments of the present invention provide a method of operation of a video transmission system including: receiving a first video frame from an input device, the first video frame having base frame parameters; dividing a color gamut into uniform regions for collecting color data from pixels of the base frame parameters; collecting pixel statistics from each of the uniform regions from the base frame parameters; determining chroma partition coordinates from the pixel statistics; deriving a search pattern of search points based on the chroma partition coordinates; and selecting a search point from the search pattern for color mapping of the first video frame.

The embodiments of the present invention provides a video transmission system, a video transmission unit for receiving a first video frame from an input device, the first video frame having base frame parameters; dividing a color gamut into uniform regions for collecting color data from pixels of the base frame parameters; collecting pixel statistics from each of the uniform regions from the base frame parameters; determining chroma partition coordinates from the pixel statistics; deriving a search pattern of search points based on the chroma partition coordinates; and selecting a search point from the search pattern for color mapping of the first video frame.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
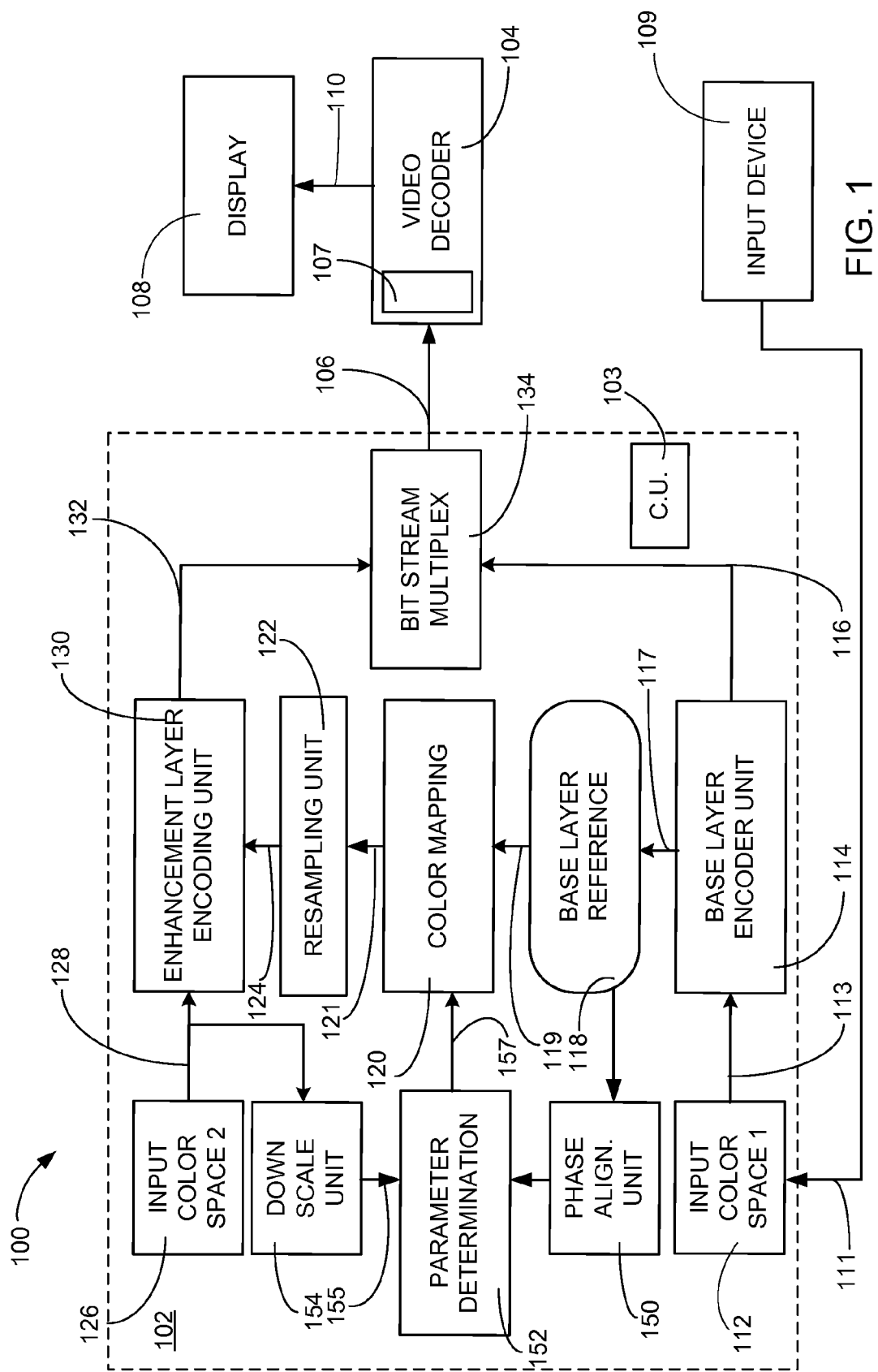
FIG. 1 is a functional block diagram of a video transmission system in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the embodiments of the present invention.

In the following description, numerous specific details are given to provide a thorough understanding of the invention. However, it will be apparent that the invention may be practiced without these specific details. In order to avoid obscuring the embodiments of the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described, having some features in common, for clarity and ease of illustration, description, and comprehension thereof, similar and like features one to another will ordinarily be described with similar reference numerals.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "unit" referred to herein means a hardware device, such as an application specific integrated circuit, combinational logic, core logic, integrated analog circuitry, or a dedicated state machine. The color components of a pixel within a video frame, such as the three values for Luminance (Y) and Chrominance ($C_b$ and $C_r$).

Referring now to FIG. 1, therein is shown a functional block diagram of a video transmission system 100 in an embodiment of the present invention. The functional block diagram of a video transmission system 100 depicts a video transmission unit 102 linked to a video decoder unit 104 by a video stream transport 106, which carries the compressed bit stream. The video decoder unit 104 can activate a reference capture unit 107 for interpreting the video stream transport 106. The video decoder unit 104 can be coupled to a display 108, such as a high definition television, a computer display, a tablet display, a smart phone display, or the like, by a decoded picture stream 110.

The video stream transport 106 can be a wired connection, a wireless connection, a digital video disk (DVD), FLASH memory, or the like. The video stream transport 106 can capture the coded video stream from the video transmission unit 102.

The video transmission unit 102 can include a control unit 103 for performing system operations and for controlling other hardware components. For example, the control unit 103 can include a processor, an embedded processor, a microprocessor, a hardware control logic, a hardware finite state machine (FSM), a digital signal processor (DSP), or a combination thereof. The control unit 103 can provide the intelligence of the video system, can control and operate the various sub-units of the video transmission unit 102, and can execute any system software and firmware.

The video transmission unit 102 can include the various sub-units described below. An embodiment of the video transmission unit 102 can include a first input color space unit 112, which can receive a first video frame 113 or a portion of a video frame. An input device 109 can be coupled to the video transmission unit 102 for sending a source video signal of full color to the video transmission unit 102. The video input sent from the input device 109 can include color data 111, which can include Luminance (Y) values and Chrominance (Cb and Cr) values for the whole picture.

The first input color space unit 112 can be coupled to a base layer encoder unit 114, which can determine a Luma (Y) level for the first video frame 113 captured by the first input color space unit 112. The base layer encoder unit 114 can output a first encoded video frame 116 as a reference for the contents of the video stream transport 106. The first encoded video frame 116 can be loaded into the reference capture unit 107, of the video decoder unit 104, in order to facilitate the decoding of the contents of the video stream transport 106.

The base layer encoder unit 114 can extract a set of base frame parameters 117 from the first video frame 113 during the encoding process. The base frame parameters 117 can include range values of Luminance (Y) and Chrominance (Cb and Cr).

The base layer encoder unit 114 can be coupled to a base layer reference register 118, which captures and holds the base frame parameters 117 of the first video frame 113 held in the first input color space unit 112. The base layer reference register 118 maintains the base frame parameters 117 including values of the Luminance and Chrominance derived from the first input color space unit 112.

The base layer reference register 118 can provide a reference frame parameter 119, which includes range values of Luminance (Y) and Chrominance ($C_b$ and $C_r$) and is coupled to a color mapping unit 120 and the phase alignment unit 150. The color mapping unit 120 can map Luminance (Y) and Chrominance ($C_b$ and $C_r$) in the frame parameter 119 to the Luminance (Y') and Chrominance ($C_b{'}$ and $C_r{'}$) in the color reference frame 121.

The color reference frame 121 can provide a basis for a resampling unit 122 to generate a resampled color frame reference 124. The resampling unit 122 can interpolate the color reference frame 121 on a pixel-by-pixel basis to modify the resolution or bit depth of the resampled color frame reference 124. The resampled color frame reference 124 can match the color space, resolution, or bit depth of subsequent video frames 128 based on the Luminance and Chrominance of the first video frame 113 associated with the same encode time.

The first video frame 113 and the subsequent video frames 128 can be matched on a frame-by-frame basis, but can differ in the color space, resolution, or bit depth. By way of an example, the reference frame parameter 119 can be captured in BT.709 color HD format using 8 bits per pixel, while the resampled color frame reference 124 can be presented in BT.2020 color 4K format using 10 bits per pixel. It is understood that the frame configuration of the resampled color frame reference 124 and the subsequent video frames 128 are the same.

The phase alignment unit 150 is coupled to the base layer reference register 118 and to the mapping parameter determination unit 152 for aligning luma sample locations with chroma sample locations and aligning chroma sample locations with luma sample locations. Chroma sample locations are usually misaligned with luma sample locations. For example, in input video in 4:2:0 chroma format, the spatial resolution of chroma components is half of that of luma component in both horizontal and vertical directions.

The sample locations can be aligned by phase shifting operations that rely on addition steps. It has been found that phase alignment on the luma (Y) sample locations, chroma blue (Cb) sample locations, and chroma red (Cr) samples locations of the reference frame parameter 119 can be implemented with several additions and shifts per sample, which has much less impact on computational complexity than multiplication steps.

A second input color space unit 126 can receive the subsequent video frames 128 of the same video scene as the first video frame 113 in the same or different color space, resolution, or bit depth. The subsequent video frames 128 can be coupled to an enhancement layer encoding unit 130. Since the colors in the video scene represented by the first video frame 113 and the subsequent video frames 128 are related, the enhancement layer encoding unit 130 can differentially encode only the difference between the resampled color frame reference 124 and the subsequent video frames 128. This can result in a compressed version of a subsequent encoded video frame 132 because the differentially encoded version of the subsequent video frames 128 can be applied to the first encoded video frame 116 for decoding the subsequent video frames 128 while transferring fewer bits across the video stream transport 106.

A matrix mapping with cross-color prediction for Luminance (Y) and Chrominance ($C_b$ and $C_r$) can be calculated by the color mapping unit 120 using the equations as follows:

$$[Y'] = [g_{00} \ g_{01} \ g_{02}] \begin{bmatrix} Y \\ C_b \\ C_r \end{bmatrix} + b_0 \quad \text{(Equation 1a)}$$

$$\begin{bmatrix} C_b' \\ C_r' \end{bmatrix} = \begin{bmatrix} g_{10} & g_{11} & g_{12} \\ g_{20} & g_{21} & g_{22} \end{bmatrix} \begin{bmatrix} Y \\ C_b \\ C_r \end{bmatrix} + \begin{bmatrix} b_1 \\ b_2 \end{bmatrix} \quad \text{(Equation 1b)}$$

where the variables of g** and b* are mapping parameters. For each region, the output of Y', $C_b'$ and $C_r'$ of the color mapping process is computed from the input from Equation 1a and 1b above. The y of the first input color space 112 is obtained by phase alignment of Y to the sampling position of $C_b$ and $C_r$ of the first input color space 112. The $c_b$ and $c_r$ of the first input color space 112 are obtained by phase alignment of $C_b$ and $C_r$ to the sampling position of Y of the first input color space 112. It has been found that the color mapping unit 120 can use equation 1a and equation 1b to map color between a base layer and an enhancement layer using addition and shifting steps instead of more computer intensive trilinear and tetrahedral interpolation.

The phase alignment operations performed inside the color mapping unit 120 are the same as the phase alignment performed by the phase alignment unit 150 as defined by standard Scalable High Efficiency Video coding (SHVC). The phase alignment of the sampling positions will be explained in further detail below.

A downscale unit 154 is used to downscale input from the second input color space unit 126. The subsequent video frames 128 from the second input color space unit 126 can be sent to the downscale unit 154 before creation of an enhancement layer by the enhancement layer encoding unit 130. The subsequent video frames 128 are downscaled to a much lower resolution to match the resolution provided by the base layer encoder unit 114. The downscale unit 154 is coupled to the mapping parameter determination unit 152 for sending a downscaled video input 155 to the mapping parameter determination unit 152.

The mapping parameter determination unit 152 is used to determine mapping parameters 157 and to estimate the corresponding prediction errors between the downscale video input 155 and the output of the color reference frame 121 from the color mapping unit 120. The mapping parameter determination unit 152 determines the parameters in a 3D lookup table color gamut scalability (CGS) model on the inputted video layers.

The mapping parameter determination unit 152 can be coupled to the color mapping unit 120. Using 3D lookup tables based on uniform and non-uniform partitioning, the mapping parameter determination unit 152 can determine more accurate mapping parameters. The mapping parameters 157 are sent to the color mapping unit 120.

The color mapping unit 120 can use the mapping parameters 157 from the mapping parameter determination unit 152. The color mapping unit 120 uses the mapping parameters 157 to color map color data in the reference frame parameter 119 to the color data in the color reference frame 121. The mapping parameter determination unit 152 will be explained in further detail below.

A bit stream multiplex unit 134 multiplexes the first encoded video frame 116 and the subsequent encoded video frame 132 for the generation of the video stream transport 106. During operation, the bit stream multiplex unit 134 can pass look-up table (LUT), generated by the mapping parameter determination unit 152, that can be used as a reference to predict the subsequent encoded video frame 132 from the first encoded video frame 116. It has been found that this can minimize the amount of data sent in the video stream transport 106 because the pixels in the first input color space unit 112 and the second input color space unit 126 represent the same scene, so the pixels in the first color space unit 112 can be used to predict the pixels in the second input color space unit 126.

Since the color relationship between the first video frame 113 and the subsequent video frames 128 may not change drastically over time, the LUT for mapping color from the reference frame parameter 119 to the color reference frame 121 is only transferred at the beginning of the video scene or when update is needed. The LUT can be used for any follow-on frames in the video scene until it is updated.

It has been discovered that an embodiment of the video transmission unit 102 can reduce the transfer overhead and therefore compress the transfer of the video stream transport 106 by transferring the first encoded video frame 116 as a reference. This allows the subsequent encoded video frame 132 of the same video scene to be transferred to indicate only the changes with respect to the associated first encoded video frame 116.

Figure 2:
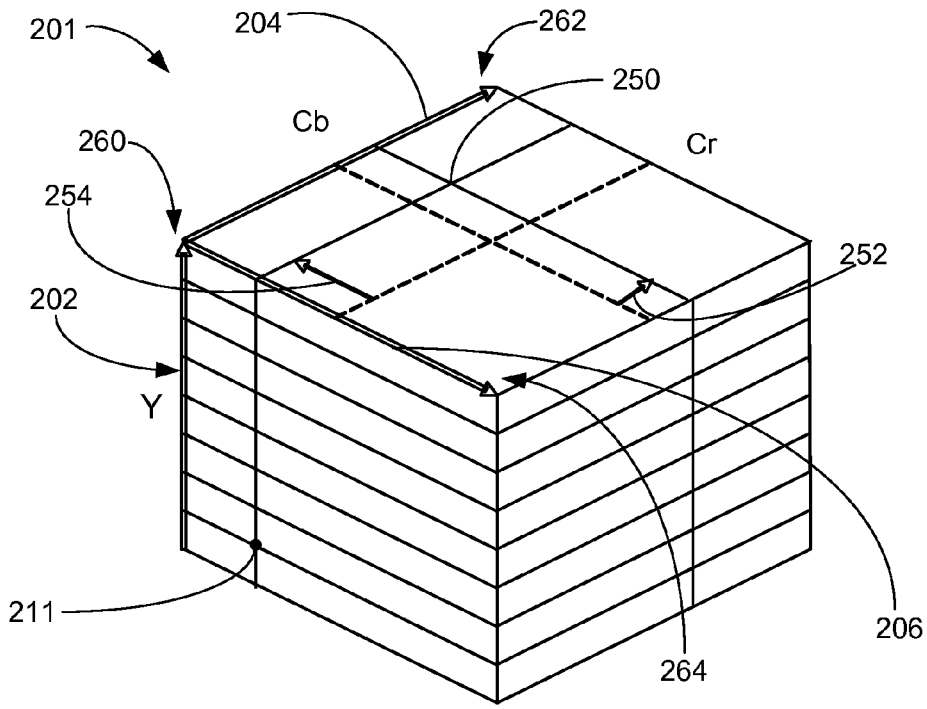
FIG. 2 is an exemplary partitioning of the color gamut used in the video transmission system of FIG. 1 in an embodiment of the present invention.

Referring now to FIG. 2, therein is shown an exemplary partitioning of the color gamut 201 used in the video transmission system 100 of FIG. 1 in an embodiment of the present invention. The partition of the color space 201 can be figuratively represented by a cube having a luminance axis 202 of (Y), a chroma blue axis 204 of (Cb), and a chroma red axis 206 of (Cr).

The cube shown in FIG. 2 can represent a color gamut scalability (CGS) model based on a 3D lookup table. For example, a base layer color space can be split into small cubes, where each cube is associated with the mapping parameters in Equations 1a and 1b for mapping base layer color in the cube to enhancement layer color. For a given base layer color sample in a cube, the computation of its prediction in the enhancement layer color space is made using the mapping parameters of the cube with Equations 1a and 1b, above.

The color (Y,Cb,Cr) of a pixel 211 at a location in a picture is a point in the cube, which is defined by [0, $Y_{max}$)×[0, $Cb_{max}$)×[0, $Cr_{max}$), where $Y_{max}=2^{BitDepthY}$ and $Cb_{max}=Cr_{max}=2^{BitDepthC}$. The exemplary partitioning of the color gamut 201 as a CGS model depicts the luminance axis 202 that can be divided into eight uniform steps.

The chroma blue axis 204 can proceed away from the luminance axis 202 at a 90 degree angle. The Chroma red axis 206 can proceed away from the luminance axis 202 and the chroma blue axis 204 at a 90 degree angle to both. For example, the representation of the color gamut 201 is shown as a cube divided into 8×2×2 regions.

The exemplary partitioning shows a method of using a 8×2×2 non-uniform partitioning of the color gamut 201. The partitioning of Y or the luminance axis 202 is divided into eight uniform regions whereas the partitioning of the chroma blue axis 204 and the chroma red axis 206 can be divided jointly into four regions, where the regions of the chroma blue axis 204 and the chroma red axis 206 are non-uniform.

The partitioning of the chroma blue axis 204 and the chroma red axis 206 can be indicated by the coordinates of of point (m, n) or as chroma partition coordinates 250. The partition for Cb is m and the partition of Cr is n, where $0 \le m < Cb_{max}$ and $0 \le n < Cr_{max}$. The partitions of Cb and Cr are independent of Y and are signaled relative to the mid position.

Using the color space model, color statistics of the pixels can be collected and mapped from information provided by the base layer reference register 118. These color statistical values can fall within a luminance range 260, a chroma blue range 262, and a chroma red range 264. These color statistical range values are used by the system to provide a prediction for the encoding process of the subsequent encoded video frame 132 of FIG. 1.

The relative position (m−$Cb_{max}$/2) and (n−$Cr_{max}$/2) are signaled, where $Cb_{max}=Cr_{max}=2^{BitDepthC}$. Each pixel collected from the base frame parameters 117 is assigned into one of the regions created by the chroma partition coordinates 250. To locate chroma partition boundaries, the offsets relative to the uniform partitioning in dot line (centerlines), which correspond to zero chroma values, are signaled for the two chroma components, respectively, in bitstream.

For example, a blue offset 252 represents the value for the offset for Cb and a red offset 254 represents the value for the offset for Cr. Generally, the partition offsets of chroma components are highly content dependent. To determine suboptimal offsets at encoder side with minimal computation, it has been found that average values of all samples in each chroma component in base layer reconstructed picture are calculated and used as the positions of the non-uniform partition boundaries.

Consequently, the offsets are calculated relative to the centerlines and signaled as part of the color mapping parameters. The determination of the chroma partition coordinates 250 will be explained in further detail below.

It has been discovered that the partitioning of the color gamut 201 into 8×2×2 non-uniform regions can further minimize the amount of data encoded in the subsequent encoded video frame 132 because only a single partition value for the chroma blue axis 204 and a single partition value for Chroma red axis 206 can be transferred as opposed to a different partition for each of the luminance regions of the luminance axis 202. This reduction in coding overhead results in better balance of bitrate and the detail transferred in the video stream transport 106 of FIG. 1. The data transfer of the LUT can be reduced by the minimization of the single partition value for chroma blue axis 204 and the single partition value for Chroma red axis 206 used in the differential encoding of the subsequent encoded video frame 132.

Figure 3:
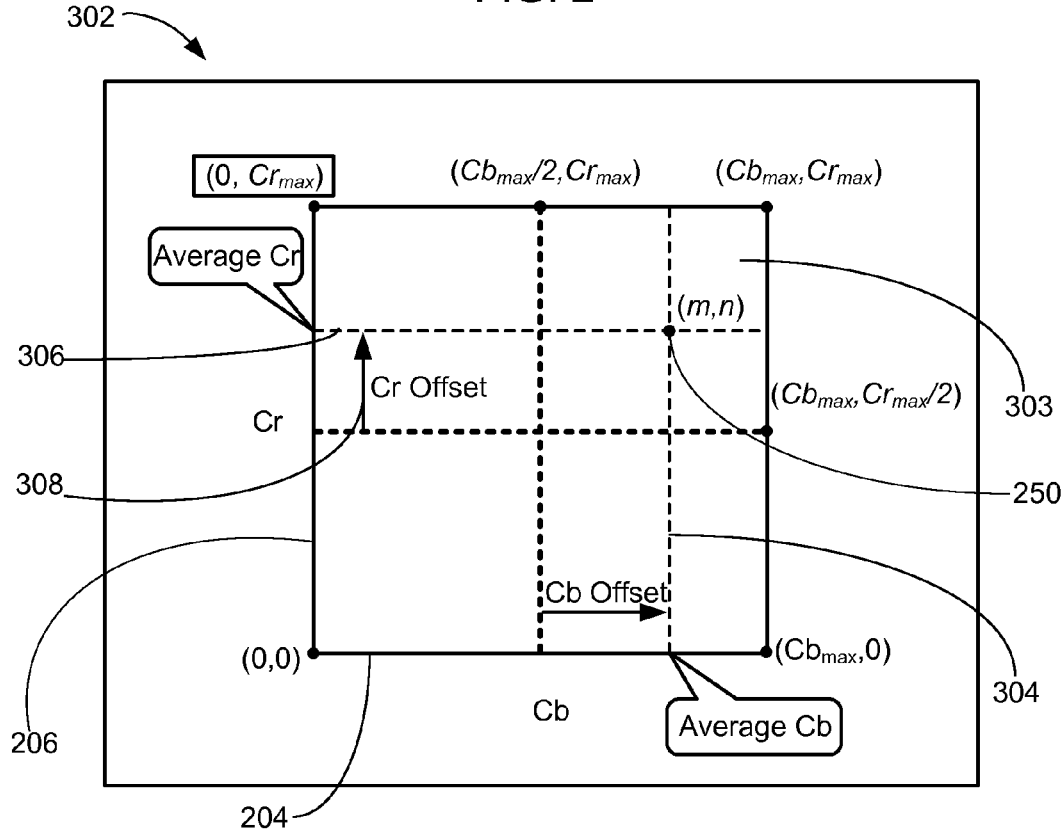
FIG. 3 is an exemplary method for chrominance partitioning using non-uniform regions.

Referring now to FIG. 3, therein is shown an exemplary method for chrominance partitioning using non-uniform regions 303. The example shows a two-dimensional example of the partitioning of the chrominance (Cb, Cr) of the color gamut 201 of FIG. 2. Since the partition of Luminance (Y) is uniform, the partitioning of Cb and Cr can be represented by a two dimensional square or a chrominance square 302. For illustrative purposes, the example can represent a top view of the 8×2×2 cube shown in FIG. 2.

The chrominance square 302 includes the chrominance values, excluding the luminance values, of a pixel from (0, 0) to ($Cb_{max}$, $Cr_{max}$). The chrominance square 302 can be partitioned into a plurality of the non-uniform regions 303, such as the 2×2 regions shown by the fine dotted lines.

In this example, the partition of the color gamut 201 can be figuratively represented by a square divided into four non-uniform regions. The partitioning of the chrominance square 302 is designated by the chroma partition coordinates 250 of (m, n), which designate a chroma blue partition 304 and a chroma red partition 306.

A collection of chrominance statistics from the base frame parameters 117 of FIG. 1 determine the values for the chroma partition coordinates 250. For example, m is equal to the average values of Cb collected from the base frame parameters 117 for all of the pixels in a single image. The average values of Cb can be rounded into an integer and can be represented by:

$$m = \overline{Cb}$$

The coordinate of n equals the average of Cr collected from the base frame parameters 117 for all of the pixels in the same image. The average values of Cr can be rounded into an integer and represented by the equation:

$$n = \overline{Cr}$$

The chroma partition coordinates 250 determine the non-uniform partitioning of the chrominance square 302 into four regions. The values of (m, n) are converted into offset values 308 relative the midpoints of the range of Cb and Cr. For color mapping parameters, the offsets are calculated relative to the centerlines and signaled.

Figure 4:
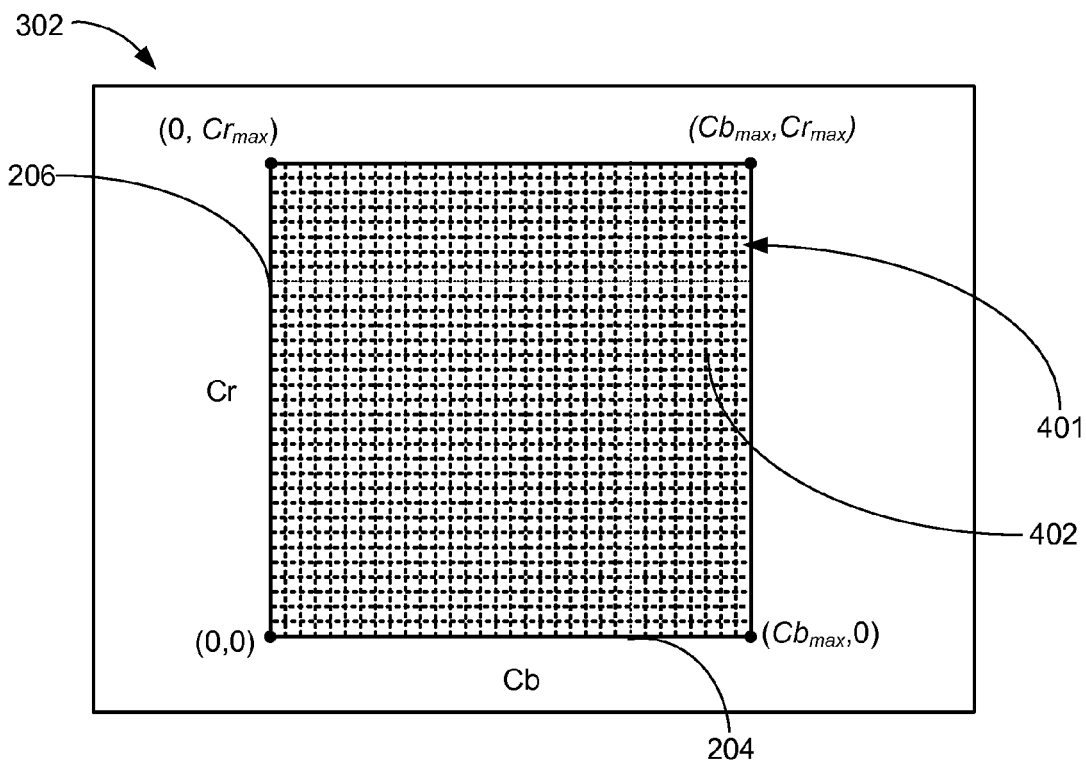
FIG. 4 is an exemplary method for chrominance partitioning using uniform regions in another embodiment of the present invention.

Referring now to FIG. 4, therein is shown an exemplary method for chrominance partitioning using uniform regions 401 in another embodiment of the present invention. The example shows the chrominance square 302 divided into 32×32 regions.

The chrominance square 302 can include uniform partitions of the chroma blue axis 204 and the chroma red axis 206. The number of partitions for the chroma blue axis 204 can be an even integer of M and the number of partitions for the chroma red axis 206 can be an even integer of N. For illustrative purposes, the chrominance square 302 can include uniform M×N partitions of 32×32, where M and N are powers of two. It is understood that M×N can be 2×2, 4×4, 8×8, and 16×16, as examples.

Each intersection of the 32×32 square can include a grid point 402. The grid point 402 is the designated partition for the estimated chrominance value (Cb, Cr) of a pixel. The grid point 402 value for the chroma blue axis 204 can be represented by (u). The grid point 402 for the chroma red axis 206 can be represented by (v).

It has been found that to reduce computation time, the search points for the chroma partition coordinate 250 of FIG. 2 is limited to the grid point 402:

$$\left(u \cdot \frac{Cb_{max}}{M}, v \cdot \frac{Cr_{max}}{N}\right) 0 \leq u < M$$

and where $0 \leq v < N$.

Figure 5:
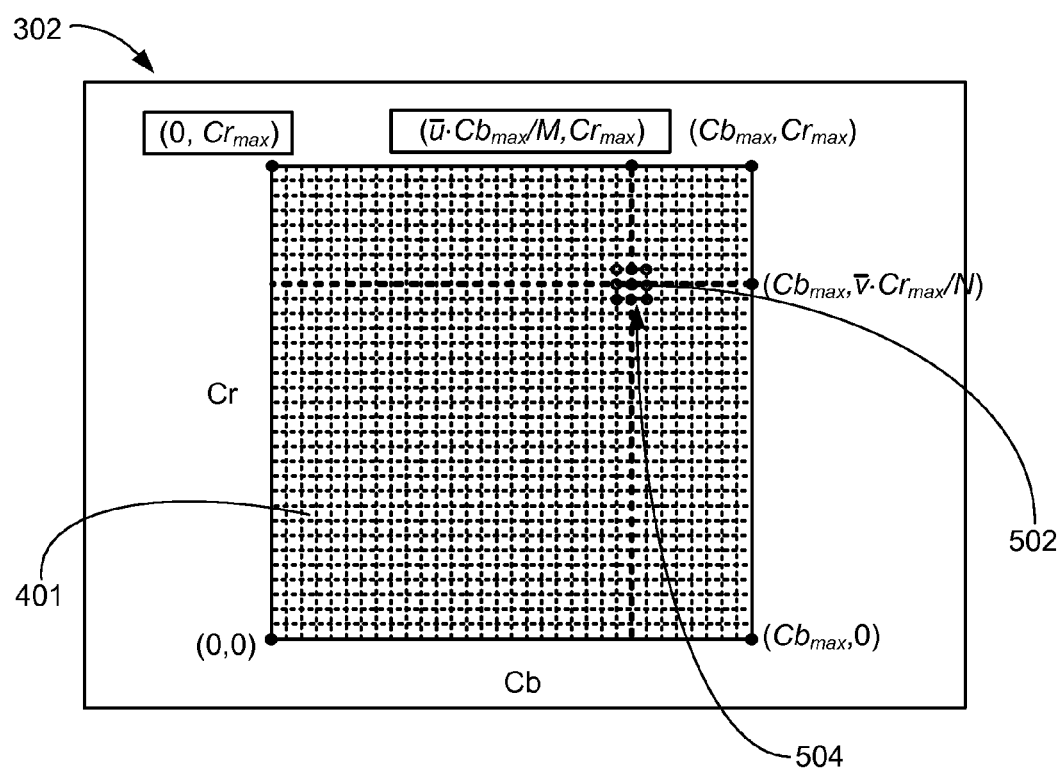
FIG. 5 is an exemplary method for determining the search points of a pixel using uniform regions in an embodiment of the present invention.

Referring now to FIG. 5, therein is shown an exemplary method for determining the search points of a pixel using uniform regions in an embodiment of the present invention. For illustrative purposes, the example shows the chrominance square 302 divided into uniform 32×32 regions although it is understood that the values of M and N can be a power of 2.

The uniform M×N partitioning of the chrominance square 302 can be used to find a more accurate 2×2 non-uniform partitioning than the partition designated by the average values of Cb and Cr. To improve the partition designated by the average values of Cb and Cr, the average values of Cb and Cr, which were collected from the base frame parameters 117 of FIG. 1, can be quantized into discrete units to find a search point 502 of a pixel on the chrominance square 302. The quantized search points of $(\bar{u}, \bar{v})$ are quantized by the following equations:

$$\bar{u} = \lfloor \overline{Cb} \cdot M / Cb_{max} \rfloor$$

$$\bar{v} = \lfloor \overline{Cr} \cdot N / Cb_{max} \rfloor$$

where the boundary or limits of the search points for the partition coordinate 250 are limited to ($u \times Cb_{max}/M$, $v \times Cr_{max}/N$) where $0 \leq u < M$ and $0 \leq v < N$. It has been found that computation is reduced because searches can be limited to these boundaries instead of conducting a search at all possible partition coordinates.

The search point 502 of $(\bar{u}, \bar{v})$ can then be used to calculate a search pattern 504 of estimated chrominance values. The search pattern 504 includes a set of grid points that are near the search point 502, for example, where $|u-\bar{u}| \leq 1$ and $|v-\bar{v}| \leq 1$. The example search pattern 504 can be represented by the surrounding points on the chrominance square that are less than or equal to one away from the search point of $(\bar{u}, \bar{v})$.

Figure 6:
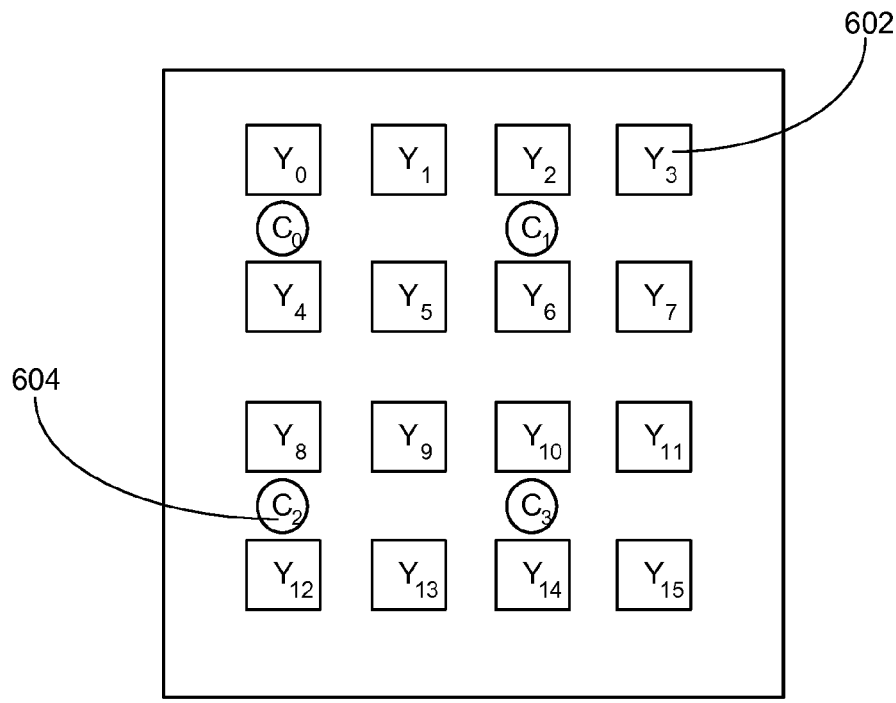
FIG. 6 is an exemplary diagram of an arrangement of luma and chroma samples used in phase alignment.

Referring now to FIG. 6, therein is shown an exemplary diagram of an arrangement of luma and chroma samples used in phase alignment. The example shows a typical arrangement of luma and chroma samples in 4:2:0 chroma format.

The squares marked as Y correspond to a luma sample location 602. The circles marked with a C correspond to a chroma sample location 604. For input video in 4:2:0 chroma format, the spatial resolution of chroma components is half that of luma component in both horizontal and vertical directions. Further, the chroma sample locations 604 are usually misaligned with luma sample locations 602. In order to improve the precision of the color mapping process, it has been found that sample locations of different color components can be aligned before the cross component operations are applied.

For example, when calculating the output for luma component, chroma sample values will be adjusted to be aligned with the corresponding the luma sample location 602 to which they apply. Similarly, when calculating the output for chroma components, luma sample values will be adjusted to be aligned with the corresponding samples of the chroma sample location 604 to which they apply.

When calculating the output for luma component, chroma sample values will be adjusted to be aligned with the corresponding luma sample location to which they apply as shown in the pseudo code example below:

$y(C_0) = (Y(Y_0) + Y(Y_4) + 1) \gg 1$ $y(C_1) = (Y(Y_2) + Y(Y_6) + 1) \gg 1$ $y(C_2) = (Y(Y_8) + Y(Y_{12}) + 1) \gg 1$ $y(C_3) = (Y(Y_{10}) + Y(Y_{14}) + 1) \gg 1$ $c_b(Y_4) = (C_b(C_0) \times 3 + C_b(C_2) + 2) \gg 2$ $c_b(Y_5) = ((C_b(C_0) + C_b(C_1)) \times 3 + (C_b(C_2) + C_b(C_3)) + 4) \gg 3$ $c_b(Y_8) = (C_b(C_2) \times 3 + C_b(C_0) + 2) \gg 2$ $c_b(Y_9) = ((C_b(C_2) + C_b(C_3)) \times 3 + (C_b(C_0) + C_b(C_1)) + 4) \gg 3$ $c_r(Y_4) = (C_r(C_0) \times 3 + C_r(C_2) + 2) \gg 2$ $c_r(Y_5) = ((C_r(C_0) + C_r(C_1)) \times 3 + (C_r(C_2) + C_r(C_3)) + 4) \gg 3$ $c_r(Y_8) = (C_r(C_2) \times 3 + C_r(C_0) + 2) \gg 2$ $c_r(Y_9) = ((C_r(C_2) + C_r(C\_3)) \times 3 + (C_r(C_0) + C_r(C_1)) + 4) \gg 3$ As shown above, it has been discovered that the formulas used in the calculation of the phase alignment of the luma sample location 602 and the chroma sample location 604 can be implemented with several additions operations and shift operations per sample, which reduces computational time and complexity than computations used on multiplication operations.

Figure 7:
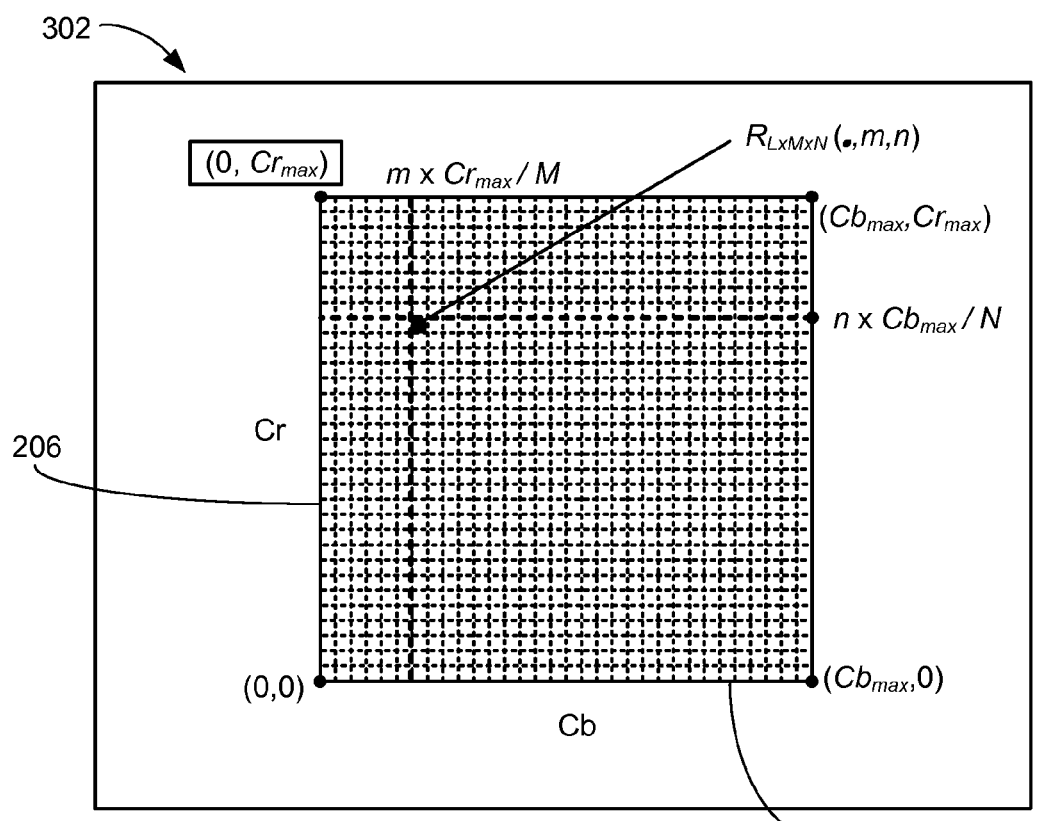
FIG. 7 is an exemplary method for the preprocessing of statistics using the chrominance square shown in FIG. 4.

Referring now to FIG. 7, therein is shown an exemplary method for the preprocessing of statistics using the chrominance square 302 shown in FIG. 4. The dotted lines along the Cb axis and Cr axis are defined by the equations ($m \cdot Cb_{max}/M$) and ($n \cdot Cr_{max}/N$), respectively.

A pixel (Y, Cb, Cr) is in a region $R_{L \times M \times N}$ (l, m, n), where $0 \leq l < L$, $0 \leq m < M$, $0 \leq n < N$, if:

$$l = \lfloor Y \cdot L / Y_{max} \rfloor, m = \left\lfloor Cb \cdot \frac{M}{Cb_{max}} \right\rfloor, \text{ and} \quad \text{Equation D}$$

$$n = \lfloor Cr \cdot N / Cr_{max} \rfloor$$

For example, the (Y, Cb, Cr) in here is the phase aligned (Y, $c_b$, $c_r$) or (y, $C_b$, $C_r$) version of Y, $C_b$, $C_r$ from the first input color space unit 112. The color space of (Y, Cb, Cr) can be divided into L×M×N regions and each region can be represented as R(l, m, n).

The parameters $g_{00}$, $g_{01}$, $g_{02}$, $b_0$ of region R(l, m, n) are obtained by linear regression which minimizes a L2 distance of luma between the color reference frame 121 of FIG. 1 and the downscaled video input 155 of FIG. 1 and can be represented by:

$E_y(l, m, n) = \Sigma_{(Y, c_b, c_r) \in R(l,m,n)} (y' - (g_{00}Y + g_{01}c_b + g_{02}c_r + b_0))^2$    Equation A The parameters $g_{10}$, $g_{11}$, $g_{12}$, $b_1$ of region R(l, m, n) are obtained by linear regression which minimizes a L2 distance of chroma blue between the color reference frame 121 and the downscaled video input 155 and can be represented by:

$$E_{c_b'}(l, m, n) = \Sigma_{(y,C_b,C_r) \in R(l,m,n)}(c_b' - (g_{10}y + g_{11}C_b + g_{12}C_r + b_1))^2 \quad \text{Equation B}$$

The parameters $g_{20}$, $g_{21}$, $g_{22}$, $b_2$ of region $R(l, m, n)$ are obtained by linear regression which minimizes a L2 distance of chroma red between the color reference frame 121 of FIG. 1 and the downscaled video input 155 of FIG. 1 and can be represented by:

$$E_{c_r'}(l, m, n) = \Sigma_{(y,C_b,C_r) \in R(l,m,n)}(c_r' - (g_{20}y + g_{21}C_b + g_{22}C_r + b_2))^2 \quad \text{Equation B}$$

The prediction error of $E(l, m, n)$ in a region $R(l, m, n)$ in the color space is given by the following equation:

$$E(l, m, n) = E_{y'}(l, m, n) + E_{c_b'}(l, m, n) + E_{c_r'}(l, m, n) \quad \text{Equation H}$$

The prediction error of partitioning the color space into $L \times M \times N$ regions is the sum of the prediction error in each region:

$$\sum_{l=0}^{L-1} \sum_{m=0}^{M-1} \sum_{n=0}^{N-1} E(l, m, n) \quad \text{Equation G}$$

In general, linear regression has a closed form solution using the statistics of the training data. In this case, the statistics for determining the parameters for $R(l, m, n)$ is designated as $S(l, m, n)$ which consists of statistics for Equation A, Equation B, and Equation C, above.

Further for example, when fully expanding Equation A, the follow statistics are found to be necessary and sufficient to evaluate Equation A and obtain the corresponding optimal solution:

$$\Sigma_{(Y,c_b,c_r) \in R(l,m,n)} y', \quad \Sigma_{(Y,c_b,c_r) \in R(l,m,n)} Y,$$
$$\Sigma_{(Y,c_b,c_r) \in R(l,m,n)} C_b, \Sigma_{(Y,c_b,c_r) \in R(l,m,n)} C_r,$$

$$\Sigma_{(Y,c_b,c_r) \in R(l,m,n)} y'Y, \quad \Sigma_{(Y,c_b,c_r) \in R(l,m,n)} y'C_b,$$
$$\Sigma_{(Y,c_b,c_r) \in R(l,m,n)} y'C_r, \Sigma_{(Y,c_b,c_r) \in R(l,m,n)} Y^2,$$

$$\Sigma_{(Y,c_b,c_r) \in R(l,m,n)} C_b Y, \quad \Sigma_{(Y,c_b,c_r) \in R(l,m,n)} C_r Y,$$
$$\Sigma_{(Y,c_b,c_r) \in R(l,m,n)} C_b^2, \Sigma_{(Y,c_b,c_r) \in R(l,m,n)} C_r C_b,$$

$$\Sigma_{(Y,c_b,c_r) \in R(l,m,n)} C_r^2, \quad \Sigma_{(Y,c_b,c_r) \in R(l,m,n)} (y')^2,$$
$$\Sigma_{(Y,c_b,c_r) \in R(l,m,n)} 1 \quad \text{Equation E}$$

By fully expanding Equation B and Equation C, the following statistics are found to be necessary and sufficient to evaluate Equations B and C and obtain the corresponding optimal solutions:

$$\Sigma_{(Y,c_b,c_r) \in R(l,m,n)} C_b', \quad \Sigma_{(Y,c_b,c_r) \in R(l,m,n)} C_r',$$
$$\Sigma_{(Y,c_b,c_r) \in R(l,m,n)} y, \Sigma_{(Y,c_b,c_r) \in R(l,m,n)} C_b,$$

$$\Sigma_{(Y,c_b,c_r) \in R(l,m,n)} C_r, \quad \Sigma_{(Y,c_b,c_r) \in R(l,m,n)} C_b' y,$$
$$\Sigma_{(Y,c_b,c_r) \in R(l,m,n)} C_b C_b', \Sigma_{(Y,c_b,c_r) \in R(l,m,n)} C_r C_b',$$

$$\Sigma_{(Y,c_b,c_r) \in R(l,m,n)} C_r' y, \quad \Sigma_{(Y,c_b,c_r) \in R(l,m,n)} C_b C_r',$$
$$\Sigma_{(Y,c_b,c_r) \in R(l,m,n)} C_r C_r', \Sigma_{(Y,c_b,c_r) \in R(l,m,n)} y^2,$$

$$\Sigma_{(Y,c_b,c_r) \in R(l,m,n)} C_b y, \quad \Sigma_{(Y,c_b,c_r) \in R(l,m,n)} C_r y,$$
$$\Sigma_{(Y,c_b,c_r) \in R(l,m,n)} C_b^2, \Sigma_{(Y,c_b,c_r) \in R(l,m,n)} C_b C_r,$$

$$\Sigma_{(Y,c_b,c_r) \in R(l,m,n)} C_r^2, \quad \Sigma_{(Y,c_b,c_r) \in R(l,m,n)} C_b'^2,$$
$$\Sigma_{(Y,c_b,c_r) \in R(l,m,n)} C_r'^2, \Sigma_{(Y,c_b,c_r) \in R(l,m,n)} 1, \quad \text{Equation F}$$

As shown by the example region marked in FIG. 7, statistics for $S_{L \times M \times N}(l, m, n)$ of the pixels in region $R_{L \times M \times N}(l, m, n)$, $0 \leq l < L$, $0 \leq m < M$, $0 \leq n < N$ are collected as a vector containing the elements in Equation E and Equation F, provided above.

Figure 8:
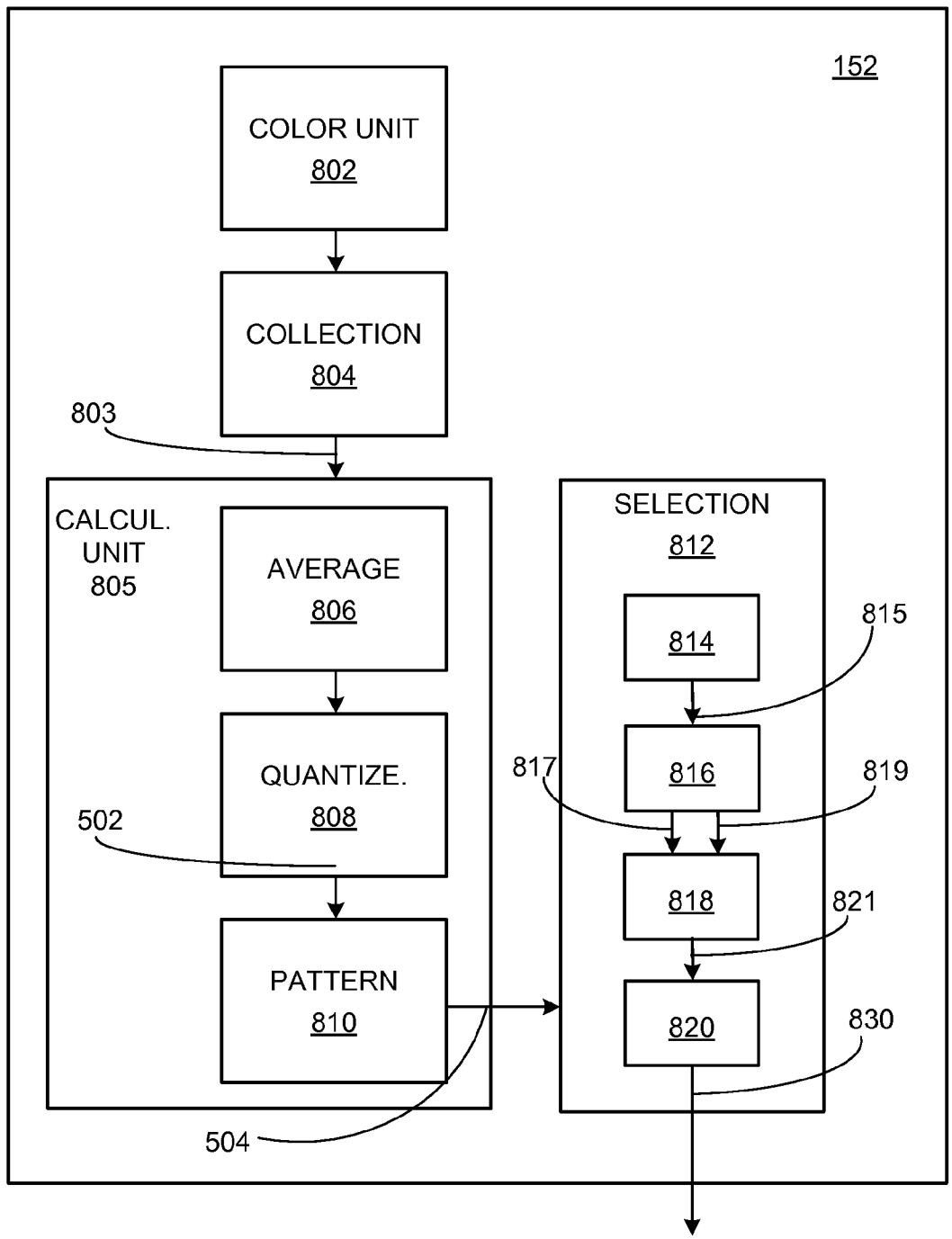
FIG. 8 is a flow chart of a method of operation of a video transmission system in another embodiment of the present invention.

Referring now to FIG. 8, therein is shown a flow chart of a method of operation of the video transmission system 100 of FIG. 1 in another embodiment of the present invention. The flow chart can include a detailed view of the mapping parameter determination unit 152 of FIG. 1. The prediction unit 152 can include sub-units for determining search points in the search pattern 504 of FIG. 5 and can be used to select a partition in the search pattern with the least square error.

The sub-units of the prediction unit 152 can include a color unit 802, a collection unit 804, a calculation unit 805, and a selection unit 812. In another embodiment, the control unit 103 of FIG. 1 can directly perform the operations of the sub-units of the prediction unit 152.

The color unit 802 can divide the color gamut 201 of FIG. 2 of the three color components of a pixel (Y, Cb, Cr) into $L \times M \times N$ uniform regions, where it has been found that L, M, N are preferred to be a power of 2 to replace multiplications by shifts. For example, the color unit 802 can generate a 3D lookup table by dividing the color gamut 201 into 8×32×32 regions. The 8×32×32 region partition can include the uniform regions 401 of FIG. 4. Further for example, the divisions can include 8×2×2, 8×4×4, 8×8×8, 8×10×10, 8×12×12, and so forth as examples.

Each phase aligned pixel of a video frame can fall within or be represented by a location within the 3D lookup table or cube. The color unit 802 can divide the color gamut 201 using the uniform partitioning method shown in FIGS. 4-5 for collecting statistics in accordance to Equations 1a and 1b. In subsequent operations, the mapping parameter determination unit 152 can merge the statistics of multiple regions of uniform partitions to form the statistics for the non-uniform partition shown in in FIG. 2-3 for computing the color mapping parameters of the non-uniform partition.

The base layer color space, taken from the first input color space unit 112 of FIG. 1, can be split into small cubes, for the collection of the statistics of the pixels in the cube for Equation 1. For example, FIG. 4 and FIG. 5 describe the method of dividing the color gamut 201 into a 3D table with 8×32×32 uniform regions 302. The partitions of the chrominance square 302 of FIG. 3 are used to assign each pixel of a video frame from the base frame parameters 117 of FIG. 1 to a partition based on the phase aligned pixel value (Y, Cb, Cr) according to Equation D.

Further, for a given example of the chroma partition coordinates 250, FIG. 2 and FIG. 3 describe the method of dividing the color gamut 201 into a 3D lookup table with 8×2×2 non-uniform regions for color mapping of the base layer color to the enhancement layer color. The partitions of the color gamut 201 are used to assign each pixel of a video frame from the base frame parameters 117 of FIG. 1 to a partition based on the phase aligned pixel value (Y, Cb, Cr) and to map the color to the enhancement layer color by Equations 1a and 1b.

The collection unit 804 collects statistics 803 for each of the 8×32×32 uniform regions R(l, m, n) in 401. The pixel statistics 803 can include statistics in Equation E and Equation F for the 8×32×32 uniform partition.

The collection unit 804 is coupled to the color unit 802 and the calculation unit 805. The collection unit 804 can send the pixel statistics 803 to the calculation unit 805.

The calculation unit 805 can receive the pixel statistics 803 and can obtain average and quantized values for Cb and Cr for deriving search points based on the pixel statistics 803. The calculation unit 805 can include an averages unit 806, a quantization unit 808, and a pattern unit 810.

The averages unit 806 can obtain the average values for Cb and Cr ($\overline{Cb}$, $\overline{Cr}$) of the picture from the pixel statistics 803 of the $L \times M \times N$ regions collected by the collect module 804. For example, the ($\overline{Cb}$, $\overline{Cr}$) values can be computed from the pixel statistics 803 of the 8×32×32 uniform region. The averages unit 806 is coupled to the collection unit 804.

The quantization unit 808 quantizes the average values of Cb and Cr ($\overline{Cb}$, $\overline{Cr}$) to determine ($\overline{u}$, $\overline{v}$) using the method shown in FIG. 5. The values for ($\overline{u}$, $\overline{v}$) can be partition coordinates and can be used to determine the search point 502 of FIG. 5. The quantization unit 808 is coupled to the averages unit 806.

The pattern unit 810 derives a list of search points for generating the search pattern 504 of FIG. 5. The search pattern 504 is generated using the method shown in FIG. 5 and shows a collection of points that are less than or equal to one away from the value of the ($\overline{u}$, $\overline{v}$). The pattern unit 810 is coupled to the quantization unit 808.

The selection unit 812 can search for the most accurate chroma partition coordinate 250 as a search point from the search pattern 504 which minimize a L2 distance between 121 and 155 in Equation G for the L×2×2 partition designated by the chroma coordinate 250.

In order to minimize the L2 distance of the 8×2×2 partition, the selection unit 812 includes a merge block 814 to compute the statistic vector $S_{L\times2\times2}(l, m, n)$ 815 according to Equation E and F for the 8×2×2 partition from the statistic vector $S_{L\times M\times N}(l, m, n)$ 803 collected for the L×M×N uniform partition by vector addition: $S_{L\times2\times2}(l, m, n) = \Sigma_{R_{L\times M\times N}(l,m',n') \subset R_{L\times2\times2}(l,m,n)} S_{L\times M\times N}(l, m', n')$. The merged statistics 815 can be sent to a merged prediction block 816.

The selection unit 812 can include the merged prediction block 816. The merged prediction block 816 can determine merged prediction parameters 817 which minimize the merged prediction error Equation H of each L×2×2 region by the least square method and the corresponding merged prediction error 819.

The selection unit 812 can include an addition block 818 coupled to the merged prediction block 816. The addition block 818 can add the merged prediction error 819 of every regions in the L×2×2 non-uniform partition to generate a partition prediction error 821 of the L×2×2 regions according to Equation G. The addition block 818 can be coupled to a selection block 820.

The selection unit 812 can include a selection block 820 for receiving the partition prediction error 821 and the corresponding prediction parameters 817 of the L×2×2 non-uniform partition. The selection block 820 can identify the search point within the search pattern 504 with the last square error. The selection unit 812 can output the identified partition and the associated prediction parameters 830.

Figure 9:
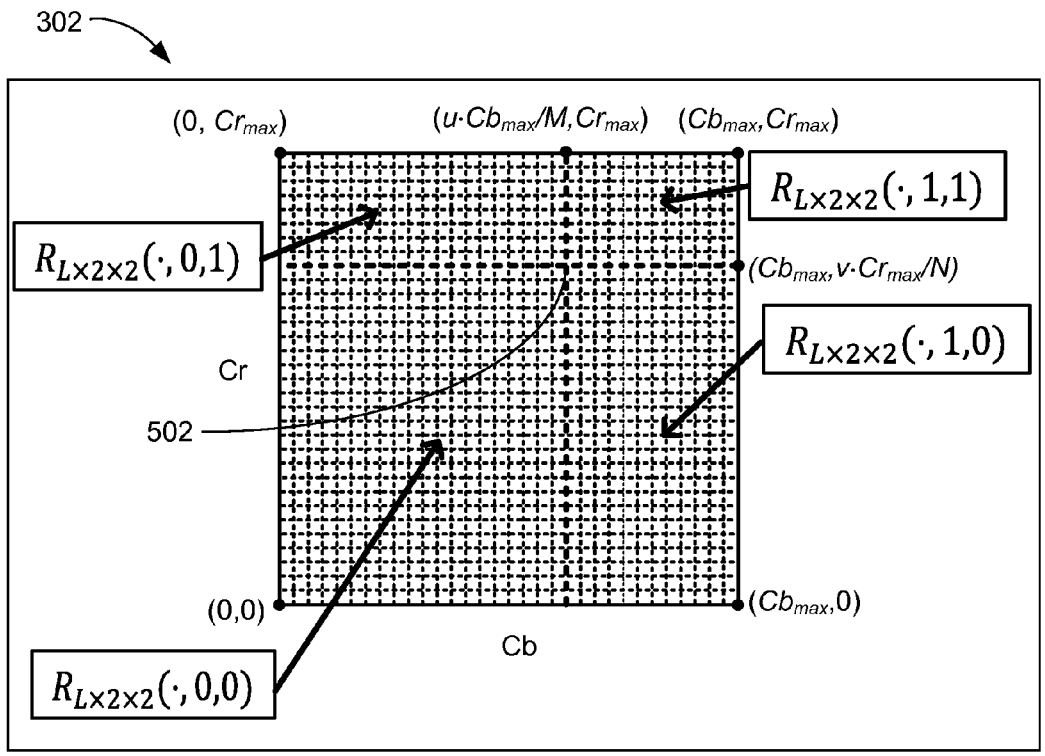
FIG. 9 is an exemplary method for determining prediction errors of a partition from L×2×2 non-uniform regions.

Referring now to FIG. 9, therein is shown an exemplary method determining prediction errors of a partition from L×2×2 non-uniform regions. For illustrative purposes, the partitioning of the chrominance square 302 is 32×32 for M×N.

The search point 502 of (u, v) is used to divide the chrominance square 302 into four regions where $R_{L\times2\times2}(\cdot, m, n)$, $0 \leq m < 2$, $0 \leq n < 2$. The statistics of the search point 502 of (u, v) are the statistics of the four regions and are taken from the base frame parameters 117 of FIG. 1.

Each region $R_{L\times2\times2}(l, m, n)$ is a collection of regions from $R_{L\times M\times N}$. Statistics of a region $R_{L\times2\times2}(l, m, n)$ is a sum of the statistics of regions $R_{L\times M\times N}(l, m', n')$ in $R_{L\times2\times2}(l, m, n)$.

It has been discovered that the video transmission unit 102 can reduce computation time in video encoding and produce highly accurate color prediction of 8×2×2 and improvements over other compression methods.

In summary, the video transmission unit 102 of FIG. 1 can perform the following:

1. Divide color space of Y, $C_b$, $C_r$ into L×M×N uniform regions, where L,M,N are preferred to be power of 2.
2. Collect statistics, such as the pixel statistics 803 of FIG. 8, needed for least square prediction for each of the L×M×N regions.
3. Obtain the average value ($\overline{Cb}$, $\overline{Cr}$) of the whole picture from the statistics of the L×M×N regions.
4. Quantize ($\overline{Cb}$, $\overline{Cr}$) to ($\overline{u}$, $\overline{v}$) as a point in M×N
5. Determine a search pattern for the partition based on ($\overline{u}$, $\overline{v}$) as a subset of the M×N points.
6. For each search point in the search pattern for the partition:
   a) Add the statistics of the L×M×N uniform regions to form the statistics of the L×2×2 non-uniform regions.
   b) Determine the prediction parameters and the prediction error of each of the L×2×2 regions by the least square method.
   c) Add the prediction error of the L×2×2 regions in the partition to form the prediction error of the partition.
   d) Select the search point in the search pattern with the least square error and the corresponding partition.

Figure 10:
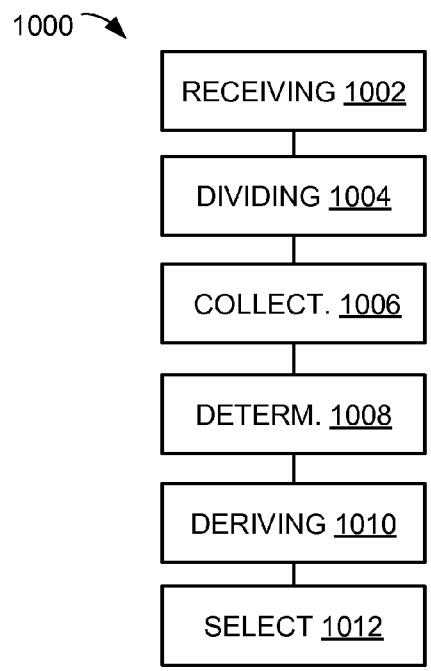
FIG. 10 is a flow chart of a method of operation of a video transmission system in a further embodiment of the present invention.

Referring now to FIG. 10, therein is shown a flow chart of a method 1000 of operation of a video transmission system in a further embodiment of the present invention. The method 1000 includes: receiving a first video frame from an input device, the first video frame having base frame parameters in a block 1002; dividing a color gamut into uniform regions for collecting color data from pixels of the base frame parameters in a block 1004; collecting pixel statistics from each of the uniform regions from the base frame parameters in a block 1006; determining chroma partition coordinates from the pixel statistics in a block 1008; deriving a search pattern of search points based on the chroma partition coordinates in a block 1010; and selecting a search point from the search pattern for color mapping of the first video frame in a block 1002.

The resulting method, process, apparatus, device, product, and/or system is straightforward, cost-effective, uncomplicated, highly versatile and effective, can be surprisingly and unobviously implemented by adapting known technologies, and are thus readily suited for efficiently and economically operating video transmission systems fully compatible with conventional encoding and decoding methods or processes and technologies.

Another important aspect of the embodiments of the present invention is that it valuably supports and services the historical trend of reducing costs, simplifying systems, and increasing performance.

These and other valuable aspects of the embodiments of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a video transmission system comprising:
   receiving a first video frame from an input device, the first video frame having base frame parameters;

dividing a color gamut into uniform regions for collecting color data from pixels of the base frame parameters;

collecting pixel statistics from each of the uniform regions from the base frame parameters;

determining chroma partition coordinates from the pixel statistics;

deriving a search pattern of search points based on the chroma partition coordinates; and selecting a search point from the search pattern for color mapping of the first video frame.

2. The method as claimed in claim 1 wherein selecting the search point from the search pattern includes:

combining the pixel statistics of each of the uniform regions for forming merged statistics of non-uniform regions;

determining merged prediction parameters and a merged prediction error of each of the non-uniform regions;

selecting a selected partition within the search pattern having the merged prediction error with the least square error.

3. The method as claimed in claim 1 further comprising outputting a first encoded video frame from a base layer encoder unit to a video stream transport.

4. The method as claimed in claim 1 wherein dividing the color gamut into the uniform regions for collecting color data includes partitioning a chrominance square into M×N regions, where M and N are powers of 2.

5. The method as claimed in claim 1 further comprising dividing the color gamut into non-uniform regions for color mapping, the non-uniform regions include partitioning a chrominance square into 2×2 regions.

6. A method of operation of a video transmission system comprising:

receiving a first video frame from an input device, the first video frame having base frame parameters;

dividing a color gamut into uniform regions for collecting color data from pixels of the base frame parameters, the color data includes luminance and chrominance;

collecting pixel statistics from each of the uniform regions from the base frame parameters;

determining chroma partition coordinates from the pixel statistics;

deriving a search pattern of search points based on the chroma partition coordinates; and selecting a search point from the search pattern for color mapping of the first video frame.

7. The method as claimed in claim 6 further comprising sending a first encoded video frame to a bit stream multiplex unit for transmission to a video decoder unit.

8. The method as claimed in claim 6 further comprising activating a reference capture unit includes combining a subsequent encoded video frame with a first encoded video frame for calculating the decoded video stream.

9. The method as claimed in claim 6 further comprising determining the chrominance partition coordinates for non-uniform regions includes determining a chroma blue partition and a chroma red partition based on an average value of a chroma blue range and an average value of a chroma red range of the first video frame.

10. The method as claimed in claim 6 further comprising generating a resampled color frame reference for matching subsequent video frames.

11. A video transmission system comprising a video transmission unit for:

receiving a first video frame from an input device, the first video frame having base frame parameters;

dividing a color gamut into uniform regions for collecting color data from pixels of the base frame parameters;

collecting pixel statistics from each of the uniform regions from the base frame parameters;

determining chroma partition coordinates from the pixel statistics;

deriving a search pattern of search points based on the chroma partition coordinates; and selecting a search point from the search pattern for color mapping of the first video frame.

12. The system as claimed in claim 11 wherein the video transmission unit is for:

combining the pixel statistics of each of the uniform regions for forming merged statistics of non-uniform regions;

determining merged prediction parameters and a merged prediction error of each of the non-uniform regions;

selecting a selected partition within the search pattern having the merged prediction error with the least square error.

13. The system as claimed in claim 11 wherein the video transmission unit is for outputting a first encoded video frame from a base layer encoder unit to a video stream transport.

14. The system as claimed in claim 11 wherein the video transmission unit is for dividing the color gamut into the uniform regions for collecting color data includes partitioning a chrominance square into M×N regions, where M and N are powers of 2.

15. The system as claimed in claim 11 wherein the video transmission unit is for dividing the color gamut into non-uniform regions for color mapping, a non-uniform regions include partitioning a chrominance square into 2×2 regions.

16. The system as claimed in claim 11 wherein the video transmission unit is for dividing the color gamut into uniform regions for collecting color data from pixels of the base frame parameters, the color data includes luminance and chrominance.

17. The system as claimed in claim 16 wherein the video transmission unit is for sending a first encoded video frame to a bit stream multiplex unit for transmission to a video decoder unit.

18. The system as claimed in claim 16 wherein the video transmission unit is for activating a reference capture unit includes combining a subsequent encoded video frame with a first encoded video frame for calculating the decoded video stream.

19. The system as claimed in claim 16 wherein the video transmission unit is for determining the chrominance partition coordinates for non-uniform regions includes determining a chroma blue partition and a chroma red partition based on an average value of a chroma blue range and an average value of a chroma red range of the first video frame.

20. The system as claimed in claim 16 wherein the video transmission unit is for generating a resampled color frame reference for matching subsequent video frames.

* * * * *